US009736083B2

(12) United States Patent
Wang et al.

(10) Patent No.: US 9,736,083 B2
(45) Date of Patent: Aug. 15, 2017

(54) TECHNIQUES FOR PACKET-SWITCHED VIDEO TELEPHONY SETUP WITH QOS PRECONDITIONS

(71) Applicant: QUALCOMM Incorporated, San Diego, CA (US)

(72) Inventors: Min Wang, San Diego, CA (US); Arungundram Chandrasekaran Mahendran, San Diego, CA (US); Tien-Hsin Lee, San Diego, CA (US); Vikram Singh, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 14/860,442

(22) Filed: Sep. 21, 2015

(65) Prior Publication Data

US 2016/0087913 A1    Mar. 24, 2016

Related U.S. Application Data

(60) Provisional application No. 62/053,761, filed on Sep. 22, 2014.

(51) Int. Cl.
*H04L 12/927* (2013.01)
*H04L 29/08* (2006.01)
(Continued)

(52) U.S. Cl.
CPC ............ *H04L 47/805* (2013.01); *H04L 47/14* (2013.01); *H04L 65/1006* (2013.01);
(Continued)

(58) Field of Classification Search
CPC ... H04L 47/805; H04L 47/14; H04L 65/1006; H04L 65/1069; H04L 65/1089; H04L 65/80; H04L 67/322
See application file for complete search history.

(56) References Cited

U.S. PATENT DOCUMENTS

2003/0033467 A1\* 2/2003 Yoshizawa .............. H04L 29/06
710/305
2004/0268407 A1\* 12/2004 Sparrell .................. G06F 1/266
725/116
(Continued)

FOREIGN PATENT DOCUMENTS

EP          2 779 637 A2     9/2014

OTHER PUBLICATIONS

International Search Report and Written Opinion—PCT/US2015/051525—ISA/EPO—Nov. 25, 2015. (11 pages).

*Primary Examiner* — Duc D Ho
(74) *Attorney, Agent, or Firm* — Arent Fox, LLP

(57) ABSTRACT

Techniques for setting up a packet-switched video telephony (PSVT) call are described. A mobile originated (MO) device may transmit an invitation for the PSVT call to a mobile terminated (MT) device. The invitation may initiate a process to reserve and identify video and audio resources to establish the PSVT call. The MO device may determine whether the video resources are available. If the video resources are not available but audio resources are available, the MO device may instead establish the PSVT call with only an audio stream call between the MO device and the MT device. If audio resources become available ahead of video resources, the PSVT call may be established with an audio stream first and a video stream is automatically added to the call when video resources are reserved later, or the
(Continued)

PSVT call is downgraded to a VoIP call if the video resources cannot be reserved.

30 Claims, 14 Drawing Sheets

(51) Int. Cl.
    *H04L 12/801*     (2013.01)
    *H04L 29/06*     (2006.01)

(52) U.S. Cl.
    CPC ...... *H04L 65/1069* (2013.01); *H04L 65/1089* (2013.01); *H04L 65/80* (2013.01); *H04L 67/322* (2013.01)

(56) References Cited

U.S. PATENT DOCUMENTS

| | | |
|---|---|---|
| 2005/0180338 A1 | 8/2005 | Pirila et al. |
| 2008/0062253 A1 | 3/2008 | Jaspersohn et al. |
| 2013/0114426 A1* | 5/2013 | Polk .................. H04L 12/5695 370/252 |

* cited by examiner

TECHNIQUES FOR PACKET-SWITCHED VIDEO TELEPHONY SETUP WITH QOS PRECONDITIONS

CLAIM OF PRIORITY

This is an application claiming priority to Provisional Application No. 62/053,761 entitled "TECHNIQUES FOR PACKET-SWITCHED VIDEO TELEPHONY SETUP WITH QOS PRECONDITIONS" filed on Sep. 22, 2014, and assigned to the assignee hereof and hereby expressly incorporated by reference herein.

BACKGROUND

The described aspects relate generally to wireless communication systems. More particularly, the described aspects relate to techniques for video telephony setup with preconditions.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. Furthermore, UMTS supports multiple radio access bearer (multi-RAB) capability, which allows simultaneous network communication with a user equipment (UE) over two or more radio access bearers. Therefore, in an aspect, multi-RAB functionality in UMTS allows for a UE to concurrently transmit and receive packet-switched (PS) and circuit-switched (CS) data. Another example of such a network is the Long Term Evolution (LTE), the radio access network using OFDMA technology, defined as a part of Evolved Packet System (EPS), a fourth generation (4G) standard developed by 3GPP for wireless communication of high-speed data for mobile phones and data terminals. LTE supports scalable carrier bandwidths, from 1.4 MHz to 20 MHz and supports both frequency division duplexing (FDD) and time-division duplexing (TDD). EPS, purely IP based or a flat packet-switched system, consists of E-UTRA (Evolved UMTS Terrestrial Radio Access) and EPC (Evolved Packet Core). The E-UTRA includes UEs and E-UTRAN (Evolved UMTS Terrestrial Radio Access Network). The E-UTRAN is referred to as evolved NodeB (eNB). The EPC, including S-GW, P-GW, MME, HSS and etc. are designed to replace the GPRS Core Network, supports seamless handovers for both voice and data to cell towers with older network technology such as GSM, UMTS, CDMA2000, Wireless Local Area Network (like Wi-Fi) and etc.

In LTE, a packet-switched video telephony (PSVT) call may be established between multiple UEs. The UE that originates the PSVT call may be referred to as a mobile originated (MO) device and the UE that receives the PSVT call may be referred to as a mobile terminated (MT) device. To provide a certain Quality of Service (QoS), an audio stream and a video stream of the PSVT call may be transmitted and received over one or more dedicated EPS bearers. The respective dedicated EPS bearers may request network resources for the audio stream and the video stream.

To minimize the occurrences of the scenario where the user of the MT device, i.e., the callee, answers the PSVT call but the PSVT call fails to be established because the network resources are not available, the callee may not be alerted until the network resources for both the audio stream and the video stream are reserved on both ends of the MO device and the MT device. As referenced herein, a callee may refer to the user of the MT device and a caller may refer to the user of the MO device.

However, because audio stream and video stream may be communicated over different dedicated EPS bearers, it is likely that the audio dedicated EPS bearer may be established more quickly than the video dedicated EPS bearer. A time interval between readiness of the two bearer may also be unpredictable. Further, in a congested scenario, video resources may not be available and there may be no signaling to notify the device that the video resources are not available. As such, the device may have to wait until a QoS timer expires before establishing a PSVT call having only audio stream. Thus, the call set up time for the audio portion of a PSVT call is generally extended from the call set up time of a typical voice call due to the unavailability of the video resources. The audio is the essential component of a conversational service and should be established as quickly as possible for a PSVT call to meet the same or better user experience than a VoIP call.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for reducing time for video telephony setup with QoS preconditions using segmented status type (also referred as local QoS preconditions), although the idea is equally applicable to using end-to-end status-types. An example method may include transmitting, from a mobile originated (MO) device, an invitation for a packet-switched video telephony (PSVT) call to a mobile terminated (MT) device, wherein the invitation initiates a process to reserve and identify video resources and audio resources to establish the PSVT call. In addition, the example method may include determining whether the video resources are available for the PSVT call. Further, the example method may include establishing the PSVT call having only an audio stream between the MO device and the MT device when the audio resources are available for the PSVT call and a determination is made that the video resources are not available for the PSVT call.

An example apparatus for video telephony setup with preconditions may include a transceiver configured to transmit information, a memory configured to store the information, and a processor in communication with the memory, the processor and the memory configured to transmit, via the transceiver and from a mobile originated (MO) device, an invitation for a PSVT call to a mobile terminated (MT) device, wherein the invitation initiates a process to reserve and identify video resources and audio resources to establish the PSVT call; determine whether the video resources are available for the PSVT call; and establish the PSVT call having only an audio stream between the MO device and the MT device when the audio resources are available for the PSVT call and a determination is made that video resources are not available for the PSVT call.

Another example apparatus for video telephony setup with preconditions may include means for transmitting, from an MO device, an invitation for a PSVT call to an MT device, wherein the invitation initiates a process to reserve and identify video resources and audio resources to establish the PSVT call. In addition, the example apparatus may include means for determining whether the video resources are available for the PSVT call. Further, the example apparatus may include means for establishing the PSVT call having only an audio stream between the MO device and the MT device when the audio resources are available for the PSVT call and a determination is made that the video resources are not available for the PSVT call.

A computer-readable medium storing computer executable code for video telephony setup with preconditions may include code for transmitting, from an MO device, an invitation for a PSVT call to an MT device, wherein the invitation initiates a process to reserve and identify video resources and audio resources to establish the PSVT call. In addition, the computer-readable medium may include code for determining whether the video resources are available for the PSVT call. Further, the computer-readable medium may include code for establishing the PSVT call having only an audio stream, between the MO device and the MT device when the audio resources are available for the PSVT call and a determination is made that the video resources are not available for the PSVT call.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
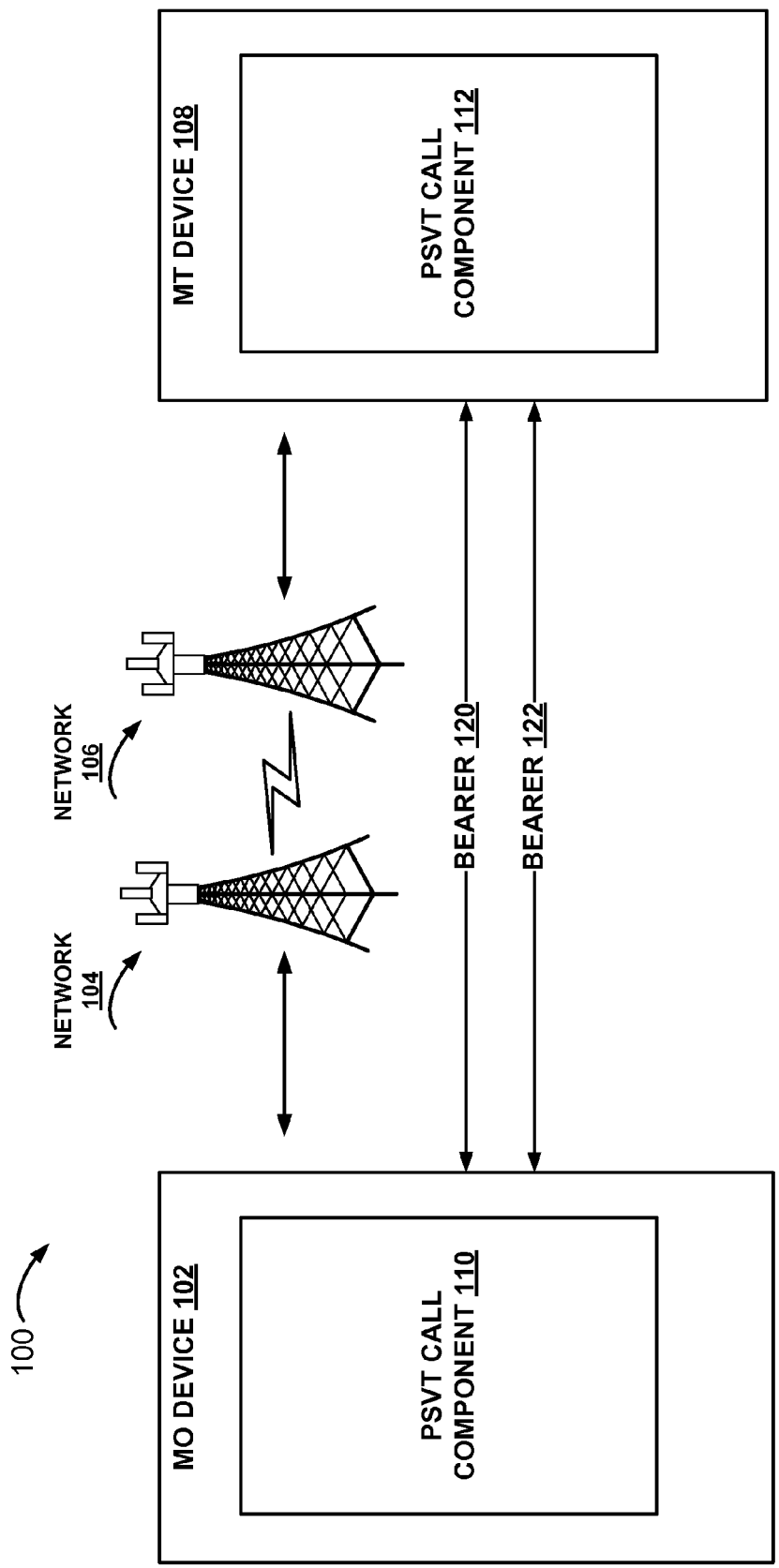
FIG. 1 is a block diagram illustrating a wireless communication system in which a UE is in communication with another UE via one or more networks, having aspects configured to reduce a time to set up a video telephony call with preconditions.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A PSVT call may be established between a mobile originated (MO) device and a mobile terminated (MT) device via one or more networks. A network associated with the MO device may be referred to as an MO network. Similarly, a network associated with the MT device may be referred to as an MT network. The MO network and the MT network may be different networks. The MO device may initiate and transmit an invitation for a PSVT call to the MT device in order to establish the PSVT call between the two devices. The invitation may include preconditions that describe requirements to meet for establishing the PSVT call. In some examples, both video resources and audio resources may be required as described by the preconditions. When video resources and audio resources are both required for the video stream and the audio stream of the PSVT call, respectively, the invitation combined with the response may initiate, or triggers the network to initiate, a process to reserve and identify the video resources and the audio resources at both MO and MT to establish the PSVT call. As referenced herein, the video resources and the audio resources may at least include the dedicated EPS bearers, and their related traffic flow template (TFT), quality of service identifier (QCI), and/or maximum bit rate, guaranteed bit rate, etc. In at least some examples, the MO network and MT network may initiate a process to reserve the video resources and audio resources based on a Session Description Protocol (SDP) offer from the MO device and an SDP answer from the MT device or other network entity if in accordance with early media, such as Customized Ring Back Tone service, Announcement, etc.

Further, the MO device may be configured to determine whether the video resources and the audio resources for the PSVT call are available. Such determination may be made based on whether a video or audio QoS is activated, by the MO network or the MT network, for the MO device and the MT device.

In at least some examples, since it may take more time to determine the availability of the video resources than it does of the audio resources, the MO device or the MO network may modify the strength-tags related to the PSVT call such that the availability of the video resources are not required to start the PSVT call. That is, once the audio resources are determined to be available, the user of the MT device may be alerted, or otherwise notified, of the PSVT call regardless of the availability of the video resources. Thus, a PSVT call that includes only the audio stream may be established sooner than a PSVT that requires both audio and video resources. If video resources later become available, the video stream may be automatically added to complete the established PSVT call without prompting the user of the MT device for any response or input.

In at least some aspects, the techniques for PSVT call setup may be implemented in connection with Evolved Universal Terrestrial Radio Access (E-UTRA) of LTE and Evolved Packet System (EPS) as per wireless wide area network (WWAN) technology standards, e.g., 2G, 3G, and 4G. A PSVT call over LTE may be referred to as ViLTE.

In at least some aspects, the present disclosure may be applicable to other scenarios in a wireless communication system. For example, the present disclosure may be implemented in a PSVT conferencing communication, in which either the MO device or the MT device is the conference server.

Referring to FIG. 1, a wireless communication 100 may include an MO device 102 and an MT device 108, each having one or more components for PSVT call setup. In an aspect, the term "component" as used herein may be, but need not be limited to, one of the parts that make up a system, may be implemented as hardware, software, firmware, or any combination thereof, and may be further divided into other components. By signaling in communication with MT device 108, MO device 102 may be configured to initiate a process to set up a PSVT call with MT device 108 via a network 104 associated with MO device 102 and/or a network 106 associated with MT device 108. MO device 102 and MT device 108 may respectively include PSVT call components 110 and 112.

In some aspects, MO device 102 and MT device 108 also may be referred to as mobile stations, subscriber stations, mobile units, subscriber units, wireless units, remote units, mobile devices, wireless devices, wireless communications devices, remote devices, mobile subscriber stations, access terminals, mobile terminals, wireless terminals, remote terminals, handsets, terminals, user agents, mobile clients, clients, or some other suitable terminology. In one aspect, MO device 102 may be a first UE and MT device 108 may be a second UE.

In at least some aspects, MO device 102 may operate as an MT device to receive calls and may include components similar to or the same as PSVT call component 112. Likewise, MT device 108 may, in some instances, operate as an MO device to initiate calls and may include a component similar to or the same as PSVT call component 110. In some other aspects, when MO device 102 and MT device 108 are in communication within a same network, network 104 associated with MO device 102 and network 106 associated with MT device 108 may refer to the same network.

The process to set up a PSVT call with MT device 108 via network 104 and/or network 106 may include one or more operations in accordance with Session Initiation Protocol (SIP) or other standardized protocols. The one or more operations may include signaling and responses between MO device 102 and MT device 108.

For example, PSVT call component 110 of MO device 102 may be configured to transmit an invitation for the PSVT call to PSVT call component 112 of MT device 108 via network 104 and/or network 106. In some aspects, network 104 and 106 may include a network entity such as a base station or a node B or an eNodeB. Strength-tags in the invitation may be modified to indicate that the video resources are "optional" for starting the PSVT call. PSVT call component 110 and/or PSVT call component 112 may determine the availability of the video resources and the audio resources; however, the availability of the video resources may not be required to start the PSVT call. Upon receiving the invitation, PSVT call component 112 may respond to the invitation with an acknowledgement message, e.g., a 183 Session in Progress provisional response in accordance with SIP via network 104 and network 106, to acknowledge the reception of the invitation. Strength-tags in the acknowledgement message may also be modified to indicate that the video resources are "optional" for starting the PSVT call. Additionally, PSVT call component 112 may start an MT QoS timer (see e.g., MT QoS timer 215 in FIG. 2B) when responds to the invitation. When network 104 and network 106 receive the acknowledgement message, networks 104 and 106 may start to reserve the audio resources and video resources for the PSVT call. In an aspect, the resources are said to not be available if the resources are not reserved, initiated, and/or allocated for the PSVT call within a time period. As referenced herein, "reserving resources" may refer to an operation that designates specific communications resources for the purpose of the implementation of a call.

When PSVT call component 110 receives the acknowledgement message, PSVT call component 110 may similarly start an MO QoS timer (see e.g., MO QoS timer 205 in FIG. 2A), which may have a similar or same duration as the MT QoS timer at MT device 108. In some aspects, however, the duration of the MO QoS timer and the duration of the MT QoS timer may be different. If the audio resources associated with MO device 102 and network 104 are reserved before the MO QoS timer expires, PSVT call component 110 may be configured to transmit an update message to notify PSVT call component 112 of the availability of the audio resources at MO device 102. When PSVT call component 112 receives the update message and if the audio resources are available before the MT QoS timer expires, PSVT call component 112 may respond to the update message with a message, e.g., 200 OK message in accordance with SIP, indicating the audio resources on both sides are successfully reserved.

Regardless of the availability of the video resources, PSVT call component 112 may be configured to alert the user of MT device 108, i.e., the callee, of the PSVT call and to transmit a message to network 106 indicating the destination device is alerting the user, e.g., a 180 Ringing message in accordance with SIP. Thus, the callee may be alerted before the MO QoS timer and/or the MT QoS timer expire and, accordingly, the setup time for the PSVT call may be reduced by allowing the audio portion (e.g., audio stream) of the call to be established between the MO device 102 and the MT device 108 even when the video portion (e.g., video stream) of the call is not ready.

In at least some aspects, PSVT call component 110 may be configured to set, within QoS attributes in the invitation, a strength-tag for the audio resources as mandatory and set a strength-tag for the video resources as optional to indicate that the availability of the video resources is not required to alert the callee. This is different from settings in which it is mandatory for video resources to be available before the callee is alerted and the audio portion (e.g., audio stream) of a PSVT call can be established.

For example, when it is mandatory for video resources to be available before the callee is alerted, the invitation in the setting may include precondition option-tag in supported header field and the strength-tag "mandatory" and "optional" for the local segment and the remote segment, respectively, and other session parameters for the related media components as follows.

|  |  |
|---|---|
| Supported: precondition, 100rel | |
| Allow: UPDATE, PRACK, . . . | |
| m = audio . . . | m = video . . . |
| a = inactive (or sendrecv) | a = inactive (or sendrecv) |
| a = curr:qos local none | a = curr:qos local none |
| a = curr:qos remote none | a = curr:qos remote none |
| a = des:qos mandatory local sendrecv | a = des:qos mandatory local sendrecv |
| a = des:qos optional remote sendrecv | a = des:qos optional remote sendrecv |

PSVT call component 110 may set "a=des:qos mandatory local sendrecv" as "a=des:qos optional local sendrecv" such that the video resources are not required to be available before the callee is alerted.

Similarly, in the acknowledgement message, e.g., a 183 Session in Progress provisional response, PSVT call component 112 may set the strength-tag "optional" for both local and remote for video, e.g., "a=des:qos optional local sendrecv" and "a=des:qos optional remote sendrecv."

When the video resources are not required to be available to start the PSVT call, the video resources might be reserved and become available before or after the callee is alerted. If the video resources are not reserved yet at the time when the callee is alerted, a video directionality of the messages between MO device 102 and MT device 108 may be set as "inactive." That is, a PSVT call with only audio stream may be established. If the video resources are not available, e.g., not reserved before the MO QoS timer and the MT QoS timer expire, PSVT call components 110 and 112 may be configured to convert or downgrade the PSVT call to a voice over IP (VoIP) call, e.g., a video port of the PSVT call may be set to "0."

If, however, the video resources become available before the QoS timer expires, video components 114 and 116 of both MO device 102 and MT device 108 may be automatically loaded or initiated for the PSVT call. In some aspects, video components 114 and 116 may at least include hardware components, e.g., cameras, software components, e.g., drivers of the cameras, firmware components, or any combination thereof associated with MO device 102 and MT device 108.

In the case where video components 114 and 116 are initiated before the callee answers the PSVT call, the PSVT call may start as a normal PSVT call that includes a video steam and an audio stream. If video components 114 and 116 are initiated after the callee answers the PSVT call, the PSVT call may start as a PSVT call with only the audio stream, and subsequently be automatically updated to a PSVT call with both audio and video streams by PSVT call components 110 and 112. PSVT call components 110 and 112 may then be configured to establish one or more first bearers (e.g., bearer 120) between MO device 102 and MT device 108 for the PSVT call with only the audio stream for handling the audio stream and establish one or more second bearers (e.g., bearer 122) between MO device 102 and MT device 108 for the PSVT call with both audio and video streams for handling the video stream. In at least some aspects, the first and second bearers may include evolved packet system bearers, radio bearers between UE and eNBs, S1 bearers between eNBs and serving gateways (SGW), and S5/S8 bearers between SGW and packet data network gateways (PGW).

In some other alternative aspects, PSVT call component 110 may be configured to delay the transmission of the update message until the video resources are reserved. That is, since audio and video resources may not be reserved at the same time, PSVT call component 110 may be configured to delay the transmission of the update message such that unnecessary signaling may be avoided when video resources are reserved within a time period after the audio resources are reserved.

Alternatively, in the case where either network 104 or network 106 includes an entity that may act as a back-to-back user agent (B2BUA) and if network 104 and/or network 106 has determined that the video resources will not be available for the PSVT call, at least one component (e.g., availability notification component 298 of FIG. 2C) of network 104 and/or network 106 may be configured to indicate the unavailability of the video resources, e.g., by removing video media line in the invitation message or setting a video port to 0, in the invitation or in the acknowledgement message (e.g., SIP 18x response) in response to the invitation before respectively forwarding the invitation to MT device 108 or forwarding the acknowledgement message to MO device 102.

Figure 2A:
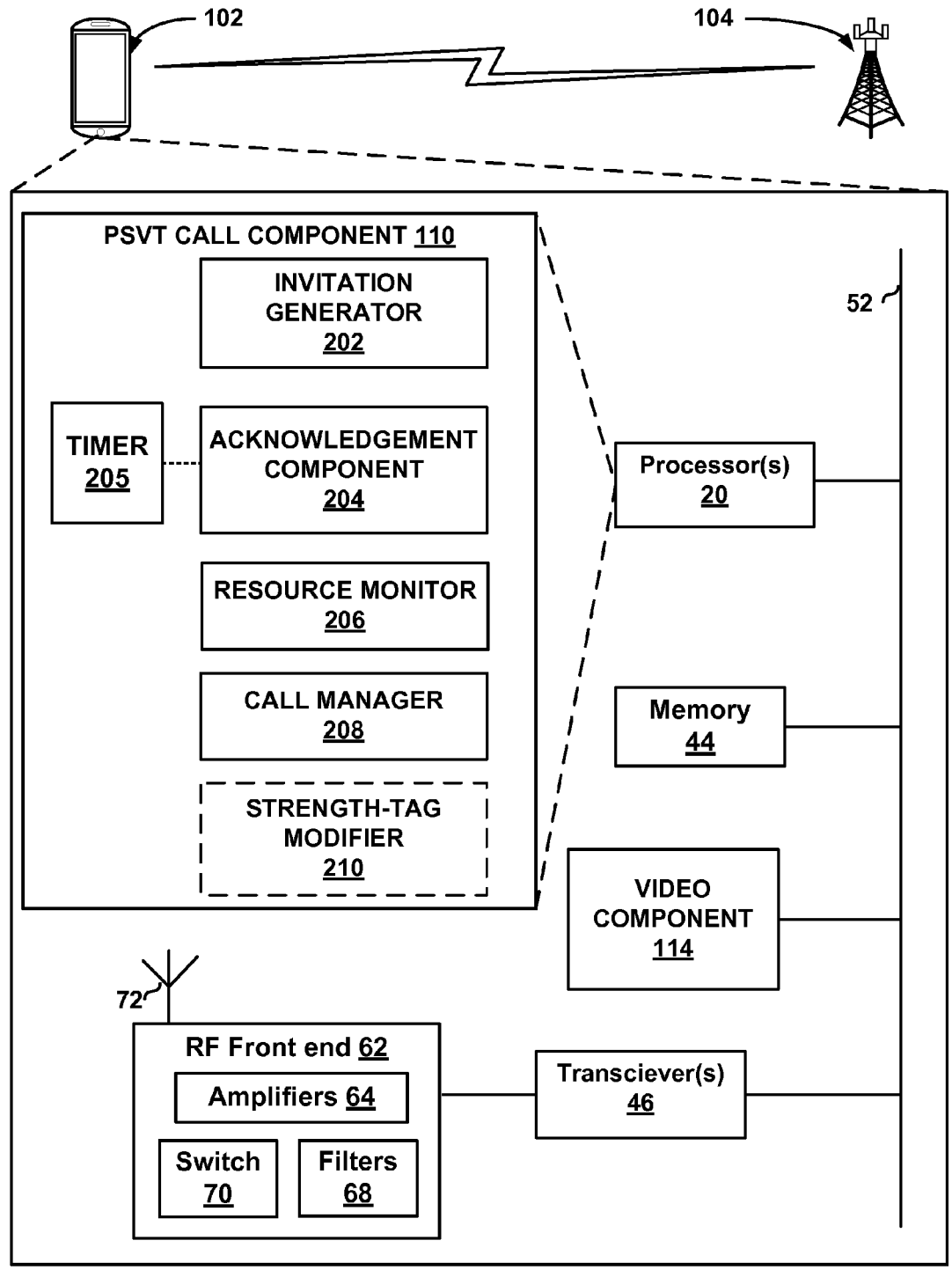
FIG. 2A is a block diagram illustrating components of a mobile originated (MO) device or UE, having aspects configured to reduce a time to set up a video telephony call with preconditions.

Referring to FIG. 2A, components by which a PSVT call setup process may be implemented are further illustrated in addition to FIG. 1. As illustrated in FIG. 2A, dash-lined blocks may indicate optional components of aspects of MO device 102.

As depicted, PSVT call component 110 of MO device 102 may, at least, include an invitation generator 202 configured to transmit an invitation for the PSVT call to PSVT call component 112 of MT device 108 via network 104 and/or network 106. The invitation may initiate a process to reserve and identify video resources and audio resources to establish the PSVT call. The process will be described in greater detail hereafter with other components in FIG. 2B.

PSVT call component 110 may further include an acknowledgement component 204 that may be configured to receive an acknowledgement message from PSVT call component 112 in response to the invitation transmitted by invitation generator 202. Upon receiving the acknowledgement message, acknowledgement component 204 may start an MO QoS timer 205 set to expire in a time period. Such time period may be configurable and may be set up when, for example, operations for PSVT call component 110 are being initiated.

Further, PSVT call component 110 may include a resource monitor 206 that may be configured to determine the availability of the video resources and the audio resources. That is, resource monitor 206 may determine that the resources associated with MO device 102 are not available if the resources are not reserved for the PSVT call within the time period indicated by MO QoS timer 205. If the audio resources associated with MO device 102 and network 104 are reserved before MO QoS timer 205 expires, resource monitor 206 may determine that the audio resources are available for the PSVT call and may be configured to transmit an update message to notify PSVT call component 112 of the availability of the audio resources at MO device 102. A message indicating the audio resources are also reserved at MT device 108 may be provided by PSVT call component 112 in response to the update message.

In addition, PSVT call component 110 may include a call manager 208 configured to establish the PSVT call with only audio stream or both audio and video streams between MO device 102 and MT device 108. That is, if the video resources are not available, e.g., not reserved before MO QoS timer 205 expires, call manager 208 may be configured to convert or downgrade the PSVT to a voice over IP (VoIP) call and establish one or more first bearers for the VoIP call that utilizes the audio resources.

If, however, the video resources of both MO device 102 and MT device 108 become available before MO QoS timer expires, call manager 208 may be configured to initiate video component 114 of MO device 102 automatically. In the case where call manager 208 initiates video component 114 before the callee answers the PSVT call, call manager 208 may start the PSVT call as a normal PSVT call that includes a video steam and an audio stream. If call manager 208 initiates video component 114 after the callee answers the PSVT call, call manager 208 may start the PSVT call with only audio stream and subsequently silently update the PSVT call with only audio stream to a PSVT with both audio and video streams. As referenced herein, "silently" may refer to operations without the callee's involvement.

Optionally, PSVT call component 110 may include a strength-tag modifier 210 configured to set, within QoS attributes in the invitation, a strength-tag for the audio resources as mandatory and setting a strength-tag for the video resources as optional to indicate that the availability of the video resources is not required for MT device 108 to alert the callee.

According to the present aspects, MO device 102 may include one or more processors 20 coupled to a memory 44 and transceiver(s) 46. One or more processors 20 may execute various components for managing PSVT call setup procedure as described herein. For instance, in some aspects, the various components related to PSVT call setup may be executed by a single processor, while in other aspects different ones of the components may be executed by a combination of two or more different processors. For example, in an aspect, the one or more processors 20 may include any one or any combination of a modem baseband processor, or a digital signal processor, or a transmit processor, or a transceiver processor. In particular, the one or more processors 20, such as a modem baseband processor, may execute PSVT call component 110 configured to manage PSVT call setup.

Moreover, transceiver(s) 46 may be configured to receive different kinds of radio signals, e.g., cellular, WiFi, Bluetooth, GPS, etc. For example, in an aspect, one or more transceiver(s) 46 may be in communication with or connected to a radio frequency (RF) front end 62 defined by, for instance one or more power amplifiers 64, one or more band specific filters 68, and one or more antennas 72.

Figure 2B:
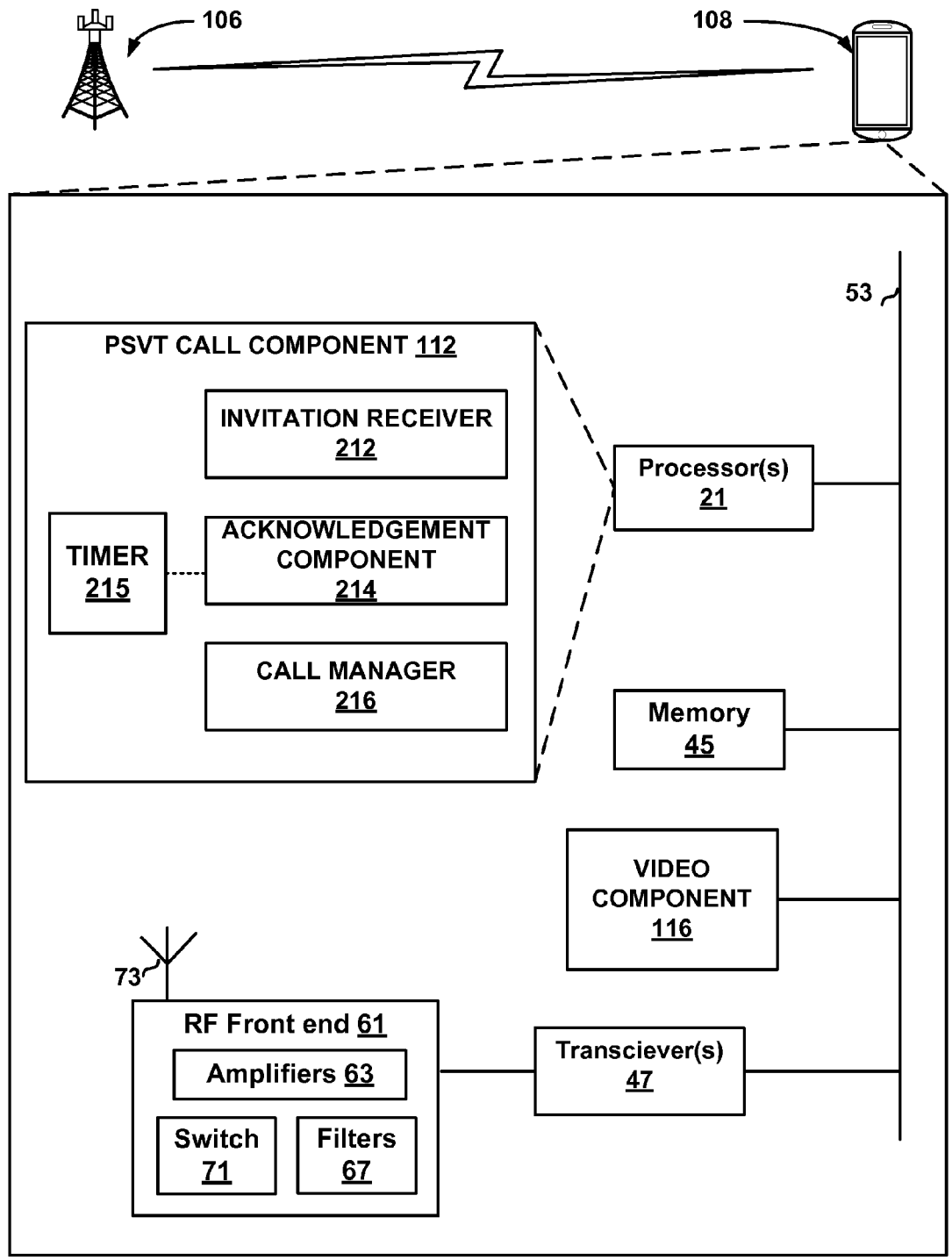
FIG. 2B is a block diagram illustrating components of a mobile terminated (MT) or UE, having aspects configured to reduce a time to set up a video telephony call with preconditions.
Figure 2C:
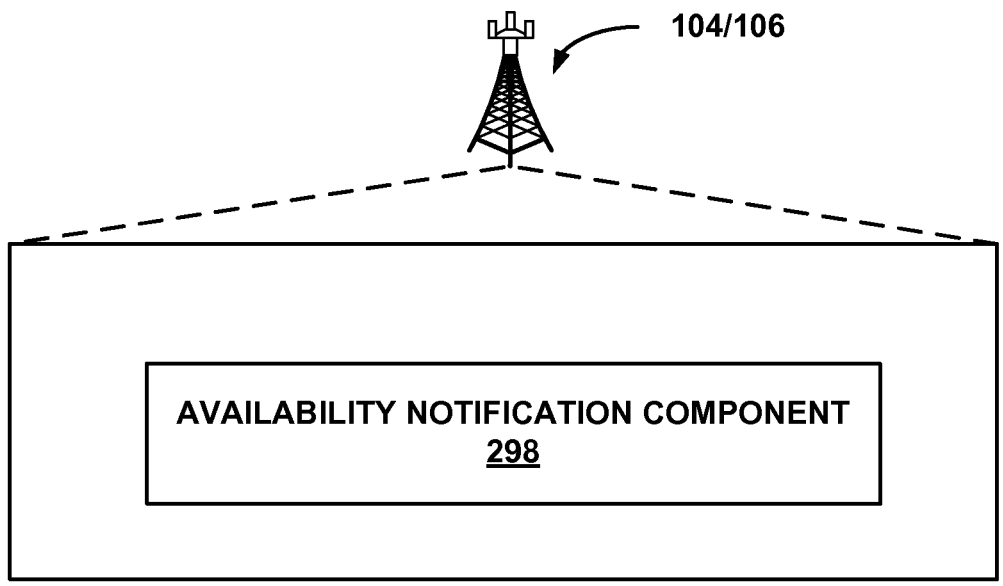
FIG. 2C is a block diagram illustrating at least one component of a network (or a network entity associated with the network) having aspects configured to reduce a time to set up a video telephony call with preconditions.

As depicted in FIG. 2B, PSVT call component 112 of MT device 108 may at least include an invitation receiver 212 configured to receive the invitation for the PSVT call from invitation generator 202 of MO device 102. The invitation may then be transmitted, or otherwise communicated, to other components of PSVT call component 112.

PSVT call component 112 may further include an acknowledgement component 214 configured to respond to the invitation. That is, upon receiving the invitation, acknowledgement component 214 may respond to the invitation with an acknowledgement message, e.g., a 183 Session in Progress provisional response in accordance with SIP, to acknowledge the reception of the invitation. Further, acknowledgement component 214 may start a MT QoS timer 215 that may have a similar duration as MO QoS timer 205 upon responding to the invitation.

In some aspects, acknowledgement component 214 may also be configured to transmit responses to the update message from resource monitor 206, which indicates the availability of the audio resources at MO device 102. In accordance with SIP, the response may include a 200 OK message indicating the audio resources on both sides are successfully reserved and a 180 Ringing message that indicates MT device 108 is alerting the callee of the PSVT call.

Further, PSVT call component 112 may include a call manager 216 configured to interact with call manager 208 to establish the PSVT call with only the audio stream or both audio and video streams between MO device 102 and MT device 108. That is, if the video resources are not available, e.g., not reserved before the MT QoS timer 215 expires, call manager 216 may establish a VoIP call, instead of the intended PSVT call. Accordingly, call manager 216 may be used to establish one or more first bearers between MO device 102 and MT device 108 for the VoIP call that utilizes the audio resources.

If, however, the video resources of both MO device 102 and MT device 108 become available before MT QoS timer 215 expires, call manager 216 may be configured to initiate video component 116 of MT device 108 automatically. Depending on the type of the call started by call manager 208 of MO device 102, call manager 216 may correspondingly set up a PSVT call with audio stream only or with both audio and video streams, and may establish one or more second bearers between MO device 102 and MT device 108 for the PSVT call that utilizes the video resources.

According to the present aspects, MT device 108 may include one or more processors 21 coupled to a memory 45 and transceiver(s) 47. One or more processors 21 may execute various components for managing PSVT call setup procedure as described herein. For instance, in some aspects, the various components related to PSVT call setup may be executed by a single processor, while in other aspects different ones of the components may be executed by a combination of two or more different processors. For example, in an aspect, the one or more processors 21 may include any one or any combination of a modem baseband processor, or a digital signal processor, or a transmit processor, or a transceiver processor. In particular, the one or more processors 21, such as a modem baseband processor, may execute PSVT call component 112 configured to manage PSVT call setup.

Moreover, transceiver(s) 47 may be configured to receive different kinds of radio signals, e.g., cellular, WiFi, Bluetooth, GPS, etc. For example, in an aspect, one or more transceiver(s) 47 may be in communication with or connected to a radio frequency (RF) front end 61 defined by, for instance one or more power amplifiers 63, one or more band specific filters 67, and one or more antennas 73.

Figure 3:
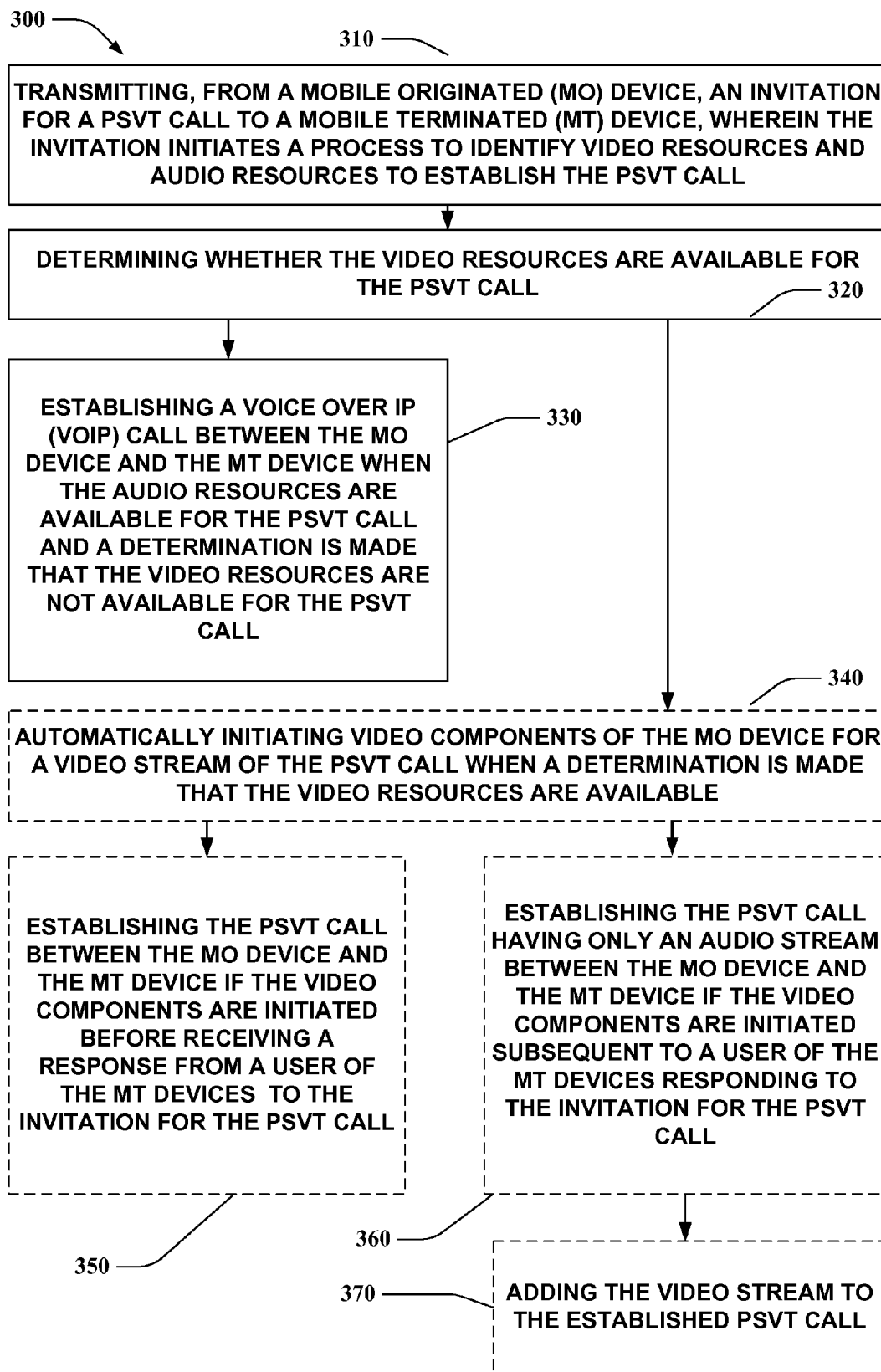
FIG. 3 is a flow chart of aspects of a method for video telephony call setup with preconditions.

Referring to FIG. 3, aspects of a method 300 for setting up a PSVT call may be performed by MO device 102 of FIG. 1 and FIG. 2A, and components thereof. In an aspect, MO device 102 may perform aspects of method 300 when operating in communication with MT device 108 via network 104 and/or network 106. More particularly, aspects of method 300 may be performed by PSVT call component 110 that includes invitation generator 202, acknowledgement component 204, MO QoS timer 205, resource monitor 206, call manager 208, and/or strength-tag modifier 210 as shown in FIG. 2A. As illustrated in FIG. 3, dash-lined blocks may indicate optional operations of aspects of method 300.

At 310, method 300 includes transmitting, from an MO device, an invitation for a PSVT call to an MT device, wherein the invitation initiates a process to reserve and identify video resources and audio resources to establish the PSVT call. For example, invitation generator 202 may be configured to transmit an invitation for the PSVT call to PSVT call component 112 of MT device 108 via network 104 and/or network 106. The invitation may initiate a process to reserve and identify video resources and audio resources to establish the PSVT call.

At 320, method 300 includes determining whether the video resources are available for the PSVT call. For example, resource monitor 206 may be configured to determine the availability of the video resources and the audio resources. That is, resource monitor 206 may determine that the resources associated with MO device 102 are not available if the resources are not reserved for the PSVT call within the time period indicated by MO QoS timer 205. If the audio resources associated with MO device 102 and network 104 are reserved before MO QoS timer 205 expires, resource monitor 206 may determine that the audio resources are available for the PSVT call and may be configured to transmit an update message to notify PSVT call component 112 of the availability of the audio resources at MO device 102.

At 330, method 300 includes establishing the PSVT call having only the audio stream between the MO device and the MT device when the audio resources are available for the PSVT call and a determination is made that the video resources are not available for the PSVT call. For example, call manager 208 may be configured to establish the PSVT call or an alternative VoIP call between MO device 102 and MT device 108. That is, if the video resources are not available, e.g., not reserved before MO QoS timer 205 expires, call manager 208 may be configured to convert the PSVT call to a VoIP call and establish one or more first bearers for the VoIP call that utilizes the audio resources.

At 340, method 300 may optionally include automatically initiating video component 114 of the MO device for a video stream of the PSVT call when a determination is made that the video resources are available. For example, if, however, the video resources of both MO device 102 and MT device 108 become available, call manager 208 may be configured to initiate video component 114 of MO device 102 automatically.

At 350, method 300 may optionally include establishing the PSVT call between the MO device and the MT device if video components 114 and 116 are initiated before receiving a response from a user of the MT devices to the invitation for the PSVT call. For example, in the case where video components 114 and 116 are initiated before the callee answers the PSVT call, call manager 208 may start the PSVT call as a normal PSVT call that includes a video steam and an audio stream.

At 360, method 300 may optionally include establishing the PSVT call having only an audio stream between the MO device and the MT device if video components 114 and 116 are initiated subsequent to a user of the MT devices responding to the invitation for the PSVT call. For example, if call manager 208 initiates video component 114 after the callee answers the PSVT call, call manager 208 may start the PSVT call as a VoIP call, e.g., VoLTE call.

At 370, method 300 may optionally include adding the video stream to the established PSVT call between the MO device and the MT device. In at least some aspects, call manager 208 may silently add the video stream without prompting the callee to input or respond to any information or without any of the callee's involvement.

Figure 4:
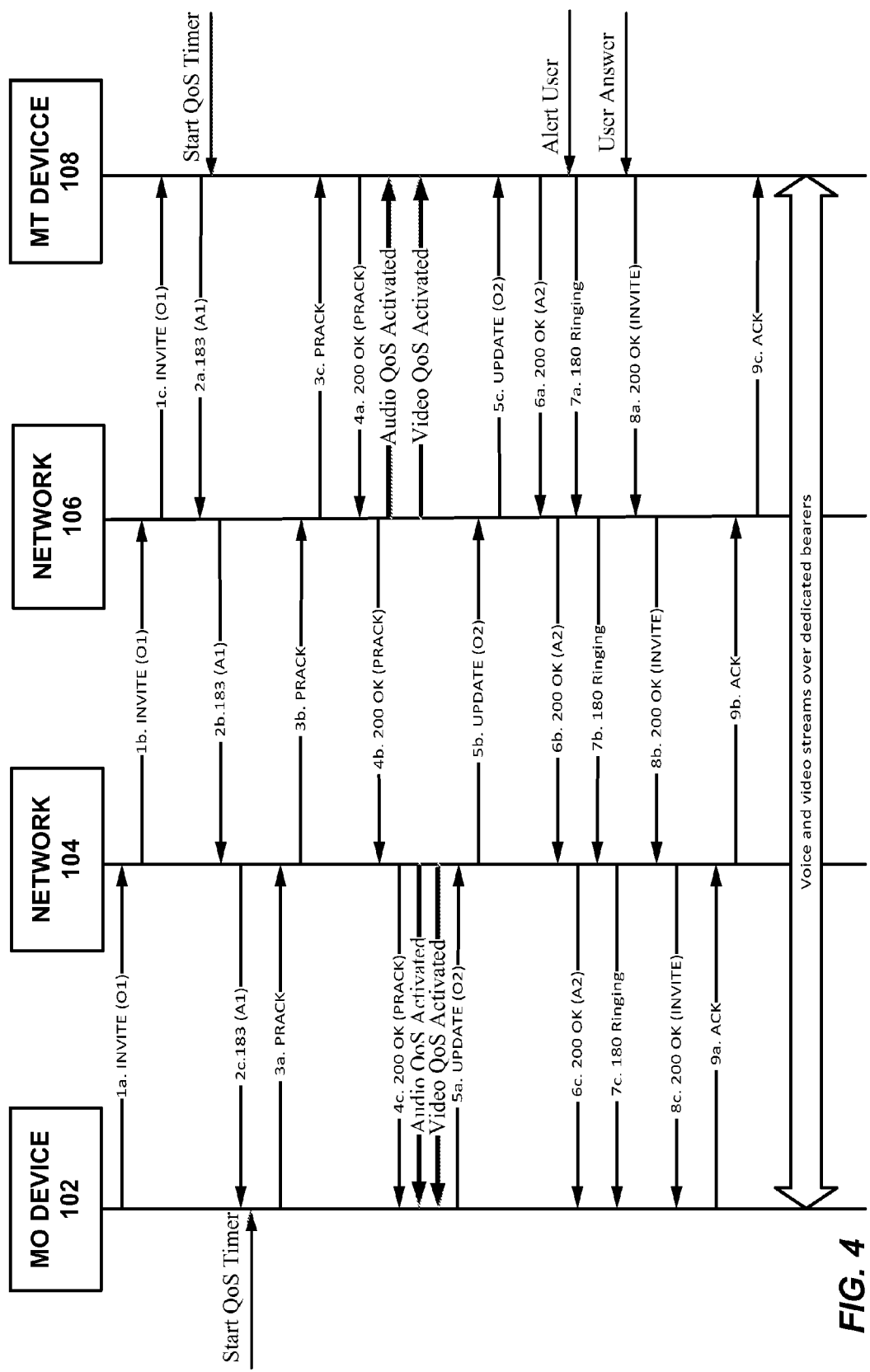
FIG. 4 is a call flow illustrating a conventional process to set up a video telephony call.

Referring to FIG. 4, a call flow illustrating a conventional process for setting up a PSVT call is shown. As depicted, at 1a, 1b, and 1c, MO device 102 may be configured to transmit an invitation for the PSVT call to MT device 108 via network 104 and/or network 106. At 2a, 2b, and 2c, MT device 108 may respond to the invitation with an acknowledgement message, e.g., a 183 Session in Progress provisional response in accordance with SIP, to acknowledge the reception of the invitation. Upon receiving the invitation, MT device 108 may start a QoS timer, e.g., MT QoS timer 215. Similarly, upon receiving the acknowledgement message, MO device 102 may start another QoS timer, e.g., MO QoS timer 205, which may have a similar duration as MT QoS timer 215 at MT device 108.

When the audio resources and the video resources are both available, network 104 may generate messages indicating the audio QoS and video QoS are both activated, in other words, reserved for the PSVT call. MO device 102 may then transmit an update message, at 5a, 5b, and 5c, to MT device 108 via network 104 (or a network entity associated with network 104) and/or network 106 (or a network entity associated with network 106) to notify MT device 108 of the availability of the audio and video resources. In some aspects, network 104 and 106 may include a network entity such as a base station or a node B or an eNodeB. MT device 108, in this example, may accordingly alert the callee upon receiving the update message, as both audio resources and the video resources are both available locally. Additionally, MT device 108 may respond to the update message with a message, e.g., 200 OK message in accordance with SIP, at 6a, 6b, and 6c, indicating the audio resources on both sides are successfully reserved. Further, MT device 108 may also transmit a message indicating the destination device is alerting the user, e.g., a 180 Ringing message in accordance with SIP, at 7a, 7b, and 7c.

When the callee answers the PSVT call, MT device 108 may further transmit another message, e.g., another 200 OK message, to MO device 102 at 8a, 8b, and 8c. The 200 OK message may indicate that the callee has accepted the call and the PSVT call is established once MO device 102 receives the 200 OK message. MO device 102 may respond with a further acknowledgement message at 9a, 9b, and 9c, which may indicate that MO device 102 received the 200 OK message. One or more bearers for the video stream and the audio stream may be established between MO device 102 and MT device 108.

However, since MO device 102 waited, until both the audio and video resources are reserved, to send the update message to MT device 108, the overall setup time, from the PSVT call is initiated to the callee is alerted, may be extended. The users of the MT device 108 and the MO device 102 may be waiting for the PSVT call to be set up. As such, the extended setup time may lower the user experience.

Figure 5:
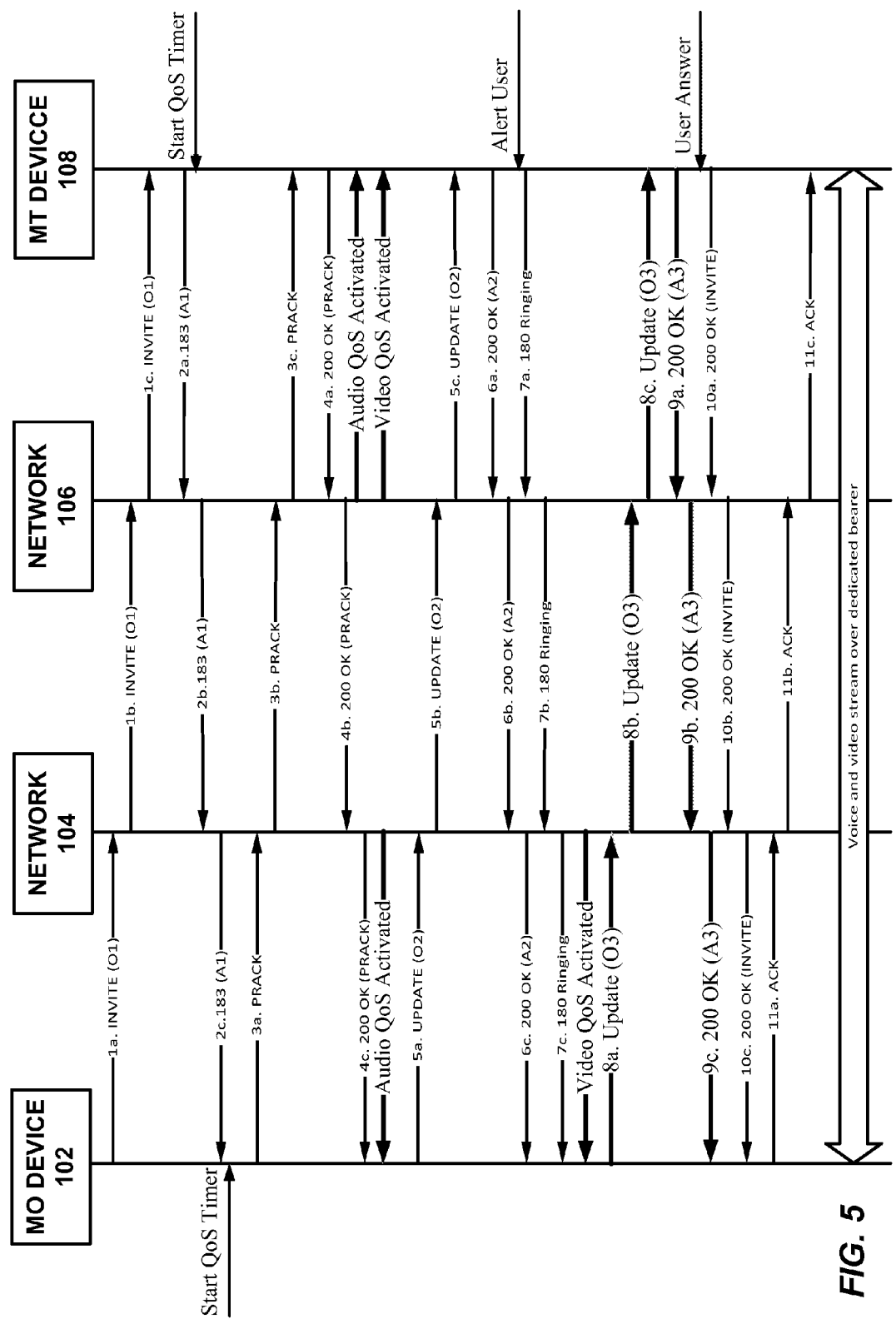
FIG. 5 is a call flow illustrating an example process to reduce a set up time for a video telephony call.

Referring to FIG. 5, a call flow illustrating an example of a process that is used to reduce a time to set up a PSVT call, is shown. Unlike the call flow illustrated in FIG. 4, MO device 102 may transmit a first update message, reporting the audio resources are reserved, to MT device 108 at 5a, 5b, and 5c. Upon receiving the first update message, MT device 108 may alert the callee.

In a case where the video resources are also available before the callee answers the PSVT call, MO device 102 may transmit a second update message, reporting the video resources are also reserved, to MT device 108. When the callee subsequently answers the PSVT call, the PSVT call may be similarly established and one or more bearers for the video stream and the audio stream may be established between MO device 102 and MT device 108.

Since MO device 102 sends the first update message as soon as the audio resources are reserved and MT device 108 alerts the callee upon receiving the first update message, the overall setup time, from the PSVT call is initiated to the callee is alerted, may be reduced, comparing with the call flow illustrated in FIG. 4.

Figure 6:
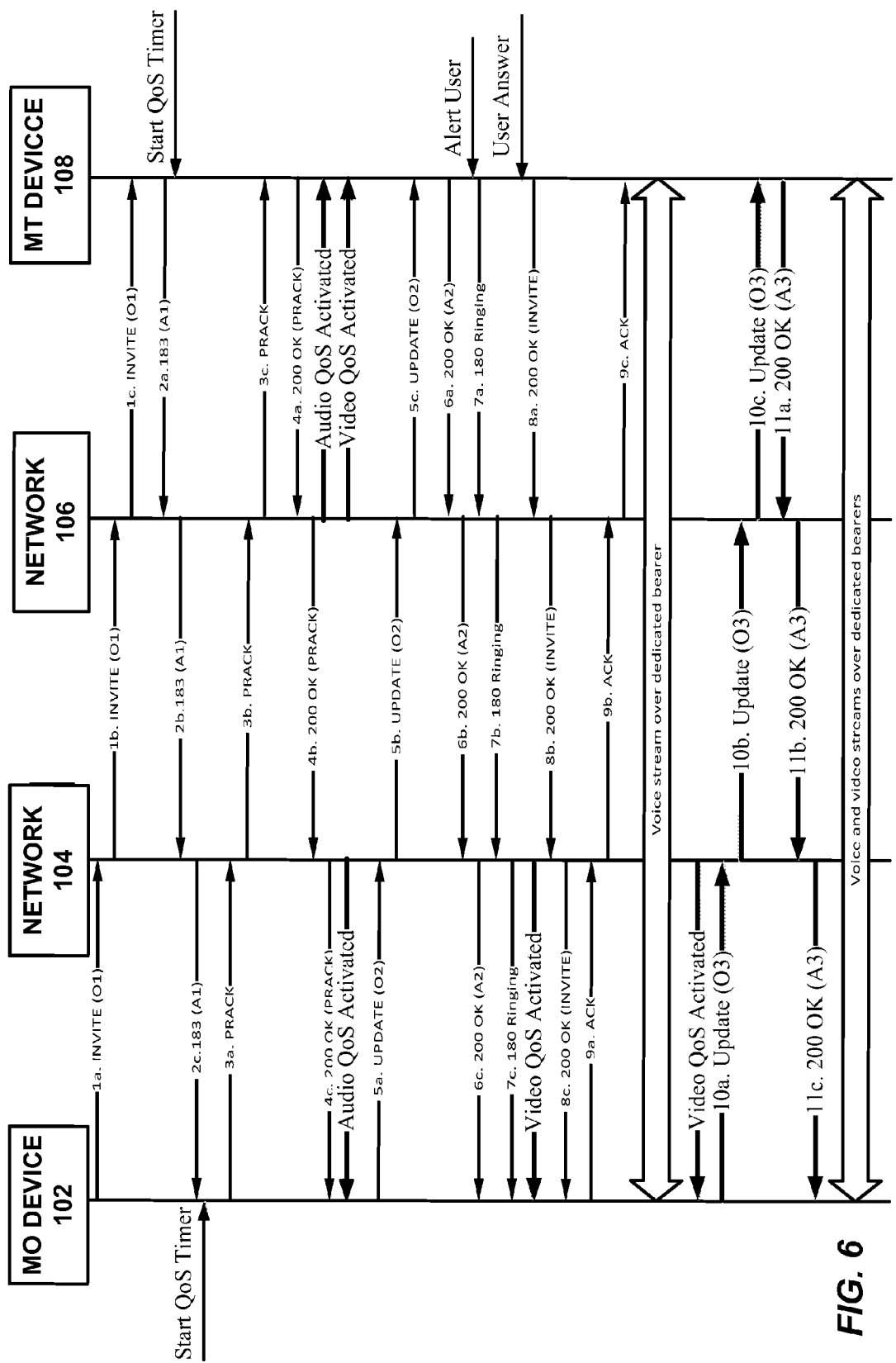
FIG. 6 is another call flow illustrating another example process to reduce a set up time for a video telephony call.

Referring to FIG. 6, another call flow illustrating an example of a process that is used to reduce a time to set up a PSVT call, is shown.

Unlike the call flow illustrated in FIG. 5, the callee may answer the PSVT call (prior to 8a) before the video resources are reserved (prior to 10a). In this case, MO device 102 may establish the PSVT call having only the audio stream first. That is, one or more bearers that carries the voice stream may be established between MO device 102 and MT device 108 before the video resources are reserved.

Subsequent to the establishment of the VoIP call, the video resources may be reserved. MO device 102 may then send a second update message, reporting the availability of the video resources, to MT device 108. MT device 108 may respond to the second update message with a 200 OK message. One or more bearers that carry the video stream may then be established between MO device 102 and MT device 108. That is, the video stream may be added to the established PSVT call.

Figure 7:
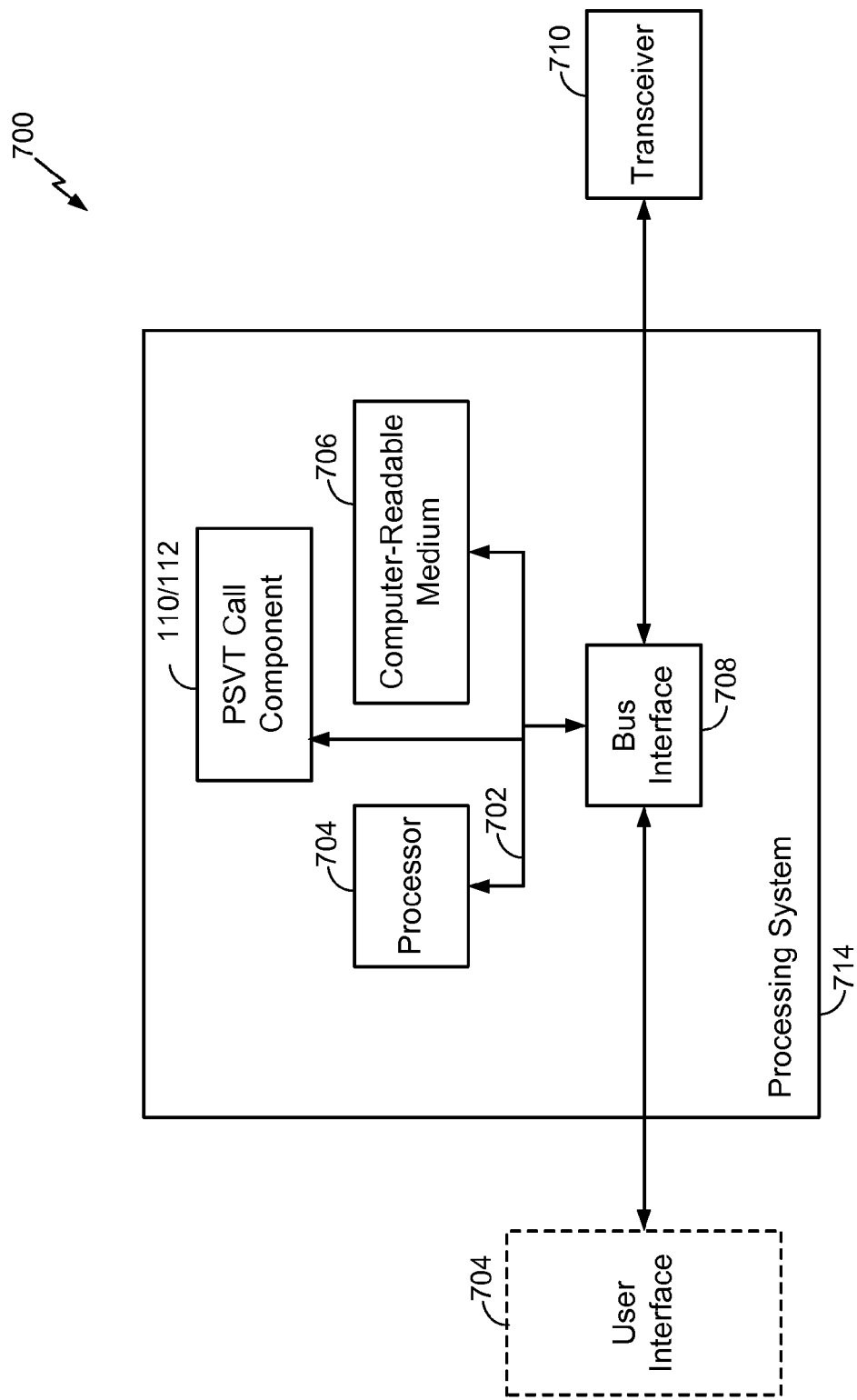
FIG. 7 is a block diagram illustrating an example of a hardware implementation for an apparatus employing a processing system having aspects configured to set up a video telephony call.

Referring to FIG. 7, an example of a hardware implementation for an apparatus 700 employing a processing system 714 having aspects configured to set up a PSVT call. In an aspect, apparatus 700 may be MO device 102 having PSVT call component 110 or MT device 108 having PSVT call component 112 of FIG. 1.

In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors, represented generally by the processor 704, one or more communications components, such as, for example, PSVT call component 110/112 of FIG. 1, and computer-readable media, represented generally by the computer-readable medium 706. The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. Depending upon the nature of the apparatus, a user interface 712 (e.g., keypad, display, speaker, microphone, joystick) may also be provided. In some aspects, user interface 712 may provide indications or alerts to the caller or the callee and may receive inputs from the caller or the callee.

The processor 704 is responsible for managing the bus 702 and general processing, including the execution of software stored on the computer-readable medium 706. The software, when executed by the processor 704, causes the processing system 714 to perform the various functions described herein for any particular apparatus. More particularly, and as described above with respect to FIG. 1, PSVT call component 110 and PSVT call component 112 may be software components (e.g., software modules), such that the functionality described with respect to each of the modules may be performed by processor 704.

The computer-readable medium 706 may also be used for storing data that is manipulated by the processor 704 when executing software, such as, for example, software modules represented by PSVT call component 110/112.

In one example, the software modules (e.g., any algorithms or functions that may be executed by processor 704 to perform the described functionality) and/or data used therewith (e.g., inputs, parameters, variables, and/or the like) may be retrieved from computer-readable medium 706.

More particularly, the processing system further includes PSVT call component 110/112. The various components or functionalities provided by PSVT call component 110/112 as illustrated in FIGS. 2A and 2B may be performed by software modules running in the processor 704, resident and/or stored in the computer-readable medium 706, one or more hardware modules coupled to the processor 704, or some combination thereof. In some aspects, processor 704 may refer to one or more of processor(s) 20 or 21 of FIGS. 2A and 2B; computer-readable medium 706 may refer to memory 44 or 45 of FIGS. 2A and 2B; and transceiver 710 may refer to transceiver(s) 46 or 47 of FIGS. 2A and 2B.

Figure 8:
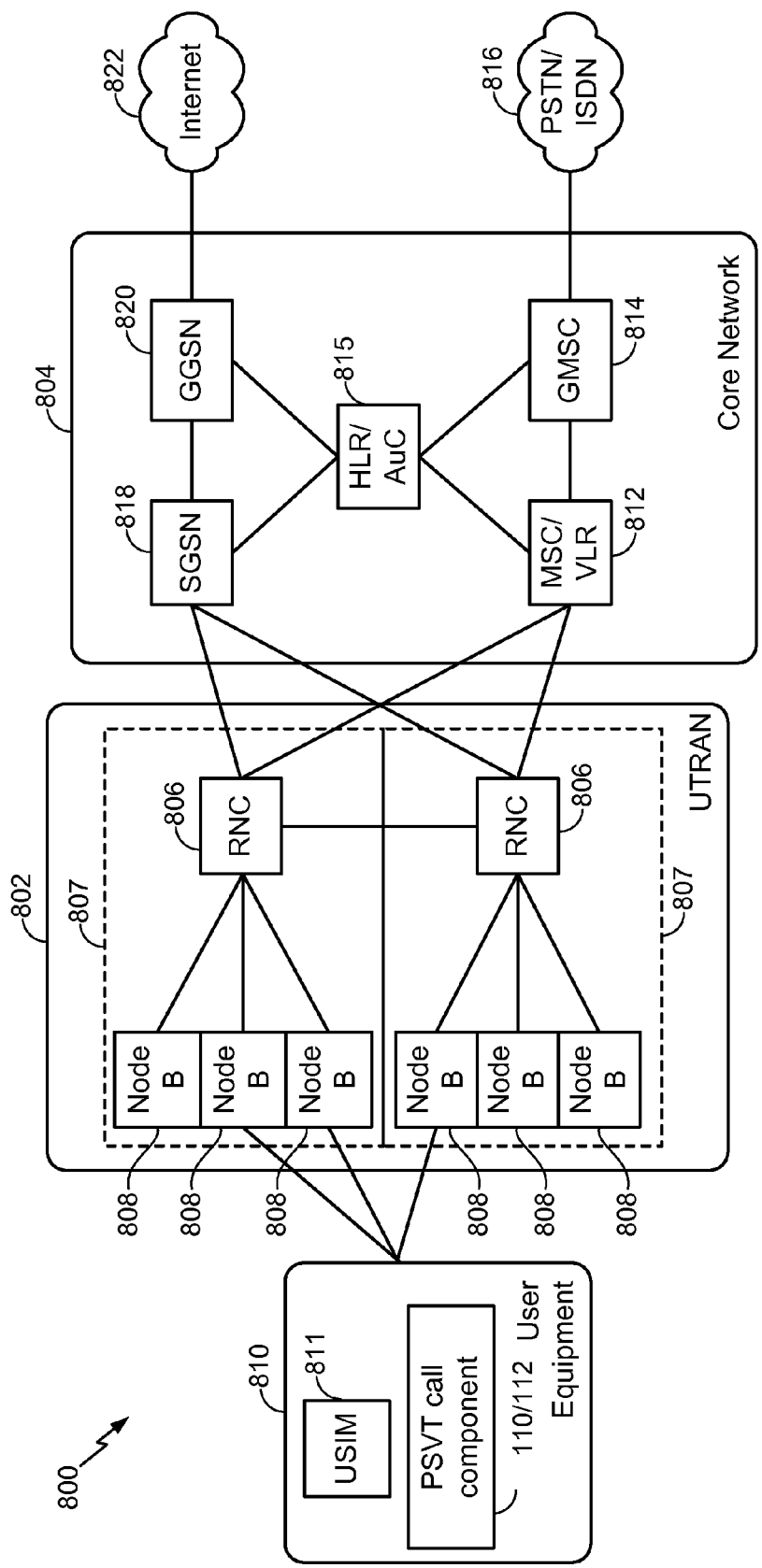
FIG. 8 is a block diagram illustrating an example of a telecommunications system having aspects configured to set up a video telephony call.

The various concepts presented throughout this disclosure may be implemented across a broad variety of telecommunication systems, network architectures, and communication standards. By way of example and without limitation, the aspects of the present disclosure illustrated in FIG. 8 are presented with reference to a UMTS system 800 employing a W-CDMA air interface and having aspects configured to prioritize time critical data for transmission during a power-limited state. A UMTS network includes three interacting domains: a Core Network (CN) 804, a UMTS Terrestrial Radio Access Network (UTRAN) 802, and User Equipment (UE) 810. In an aspect, UE 810 may be an example of MO device 102 having PSVT call component 110 or MT device 108 having PSVT call component 112 of FIG. 1. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 810 and a Node B 808, which may be an example of an entity or component of network 104 or network 106 of FIG. 1, may be considered as including a physical (PHY) layer and a medium access control (MAC) layer. Further, communication between a UE 810 and an RNC 806 by way of a respective Node B 808 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 25.331 v9.1.0, incorporated herein by reference.

The geographic region covered by the RNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The DL, also called the forward link, refers to the communication link from a Node B 808 to a UE 810, and the UL, also called the reverse link, refers to the communication link from a UE 810 to a Node B 808.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 808 and a UE 810. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 810 provides feedback to the Node B 808 over the HS-DPCCH to indicate whether it correctly decoded a packet on the downlink.

HS-DPCCH further includes feedback signaling from the UE 810 to assist the Node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 808 and/or the UE 810 may have multiple antennas supporting MIMO technology. The use of MIMO technology enables the Node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 810 to increase the data rate or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 810 to recover the one or more the data streams destined for that UE 810. On the uplink, each UE 810 may transmit one or more spatially precoded data streams, which enables the Node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
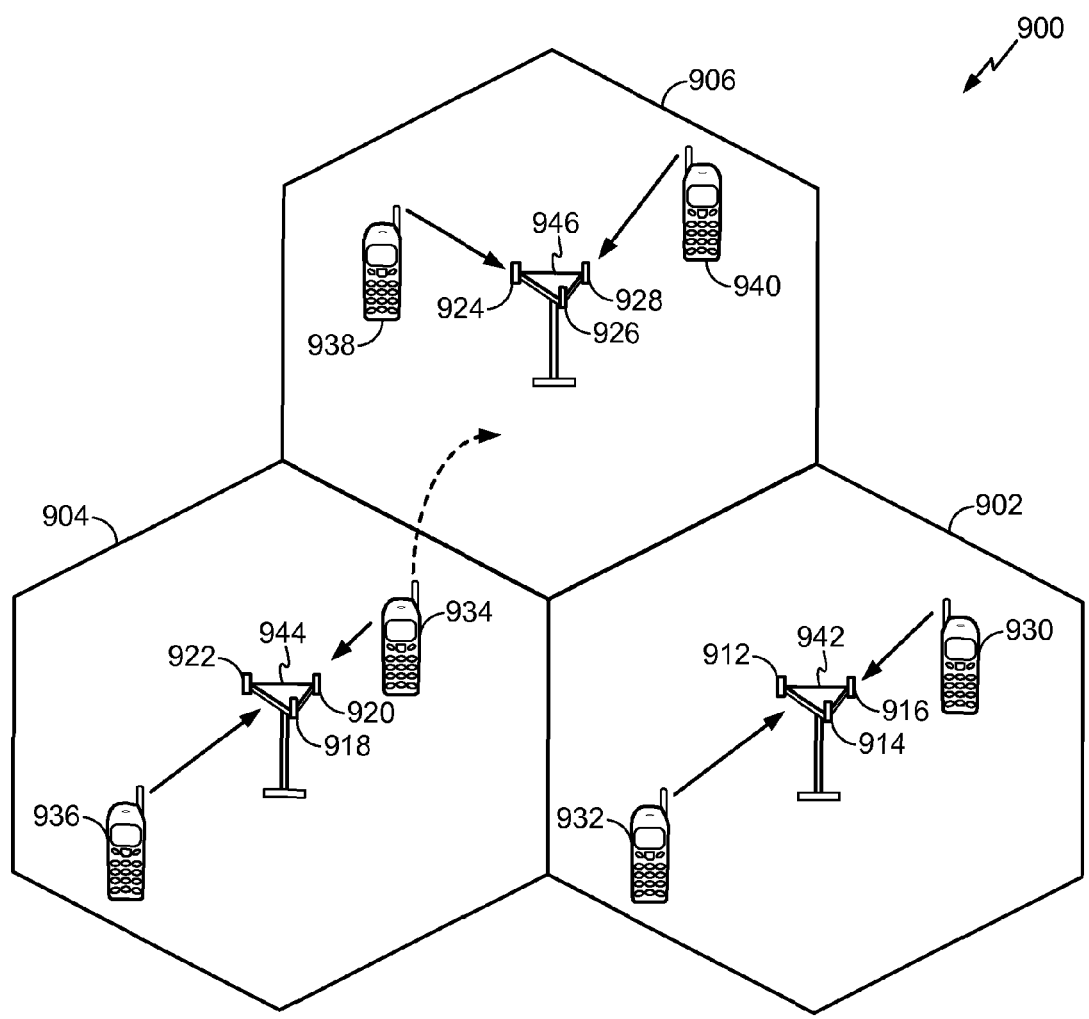
FIG. 9 is a block diagram illustrating an example of an access network having aspects configured to set up a video telephony call.

Referring to FIG. 9, an access network 900 is in a UTRAN architecture having aspects configured to prioritize time critical data for transmission during a power-limited state. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. In an aspect, one of UEs 930, 932, 934, 936, 938, and/or 940 may be an example of MO device 102 having PSVT call component 110 or MT device 108 having PSVT call component 112 of FIG. 1. Here, each Node B 942, 944, and 946 is configured to provide an access point to a CN 804 (see FIG. 8) for all the UEs 930, 932, 934, 936, 938, 940 in the respective cells 902, 904, and 906. In an aspect, Node Bs 942, 944, and 946 may be examples of Node Bs (or similar network entities) associated with network 104 and/or network 106 of FIG. 1.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 806 (see FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 10.

Figure 10:
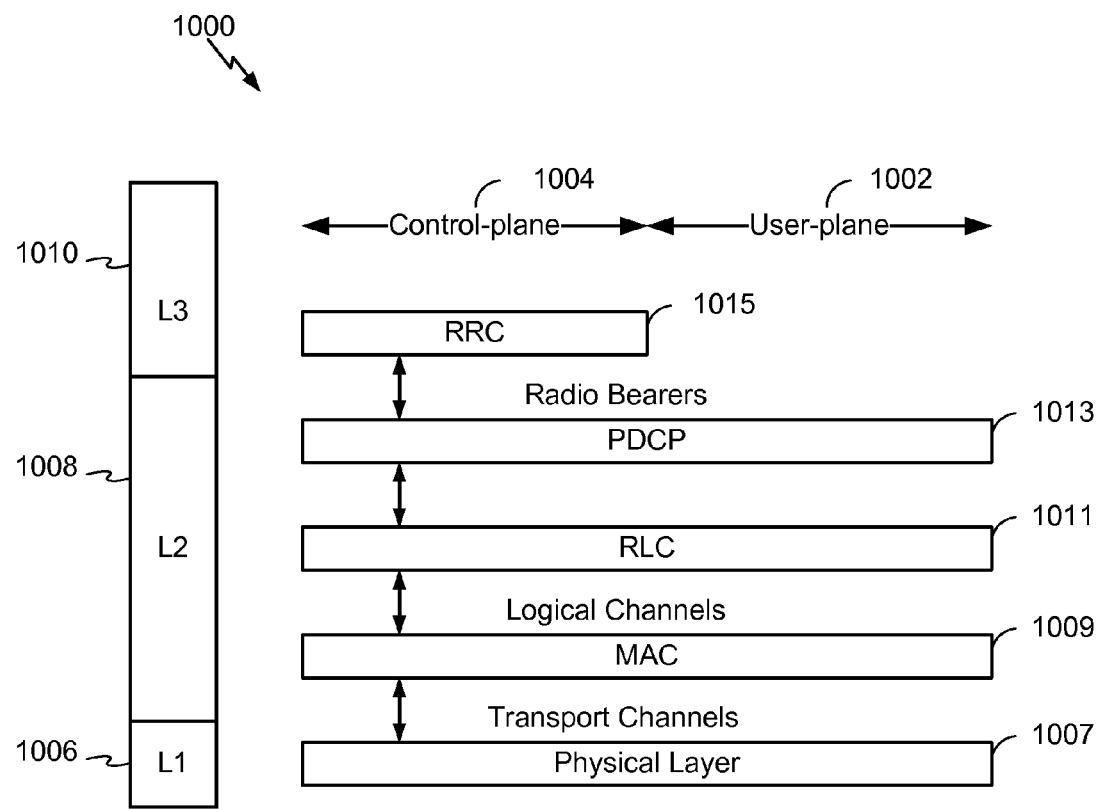
FIG. 10 is a block diagram illustrating an example of a radio protocol architecture for user and control planes in connection with setting up a video telephony call.

Referring to FIG. 10, an example radio protocol architecture 1000 relates to the user plane 1002 and the control plane 1004 of a user equipment (UE) or Node B/base station in communication with one another and having aspects configured to set up a PSVT call. In an aspect, architecture 1000 may be included in a UE such as MO device 102 having PSVT call component 110 and/or MT device 108 having PSVT call component 112 of FIG. 1. In an aspect, architecture 1000 may be included in a base station, such as base stations associated with network 104 and/or network 106 of FIG. 1. The radio protocol architecture 1000 for the UE and Node B is shown with three layers: Layer 1 1006, Layer 2 1008, and Layer 3 1010. Layer 1 1006 is the lowest lower and implements various physical layer signal processing functions. As such, Layer 1 1006 includes the physical layer 1007. Layer 2 (L2 layer) 1008 is above the physical layer 1007 and is responsible for the link between the UE and Node B over the physical layer 1007. Layer 3 (L3 layer) 1010 includes a radio resource control (RRC) sublayer 1015. The RRC sublayer 1015 handles the control plane signaling of Layer 3 between the UE and the UTRAN.

In the user plane, the L2 layer 1008 includes a media access control (MAC) sublayer 1009, a radio link control (RLC) sublayer 1011, and a packet data convergence protocol (PDCP) 1013 sublayer, which are terminated at the Node B on the network side. Although not shown, the UE may have several upper layers above the L2 layer 1008 including a network layer (e.g., IP layer) that is terminated at a PDN gateway on the network side, and an application layer that is terminated at the other end of the connection (e.g., far end UE, server, etc.).

The PDCP sublayer 1013 provides multiplexing between different radio bearers and logical channels. The PDCP sublayer 1013 also provides header compression for upper layer data packets to reduce radio transmission overhead, security by ciphering the data packets, and handover support for UEs between Node Bs. The RLC sublayer 1011 provides segmentation and reassembly of upper layer data packets, retransmission of lost data packets, and reordering of data packets to compensate for out-of-order reception due to hybrid automatic repeat request (HARQ). The MAC sublayer 1009 provides multiplexing between logical and transport channels. The MAC sublayer 1009 is also responsible for allocating the various radio resources (e.g., resource blocks) in one cell among the UEs. The MAC sublayer 1009 is also responsible for HARQ operations.

Figure 11:
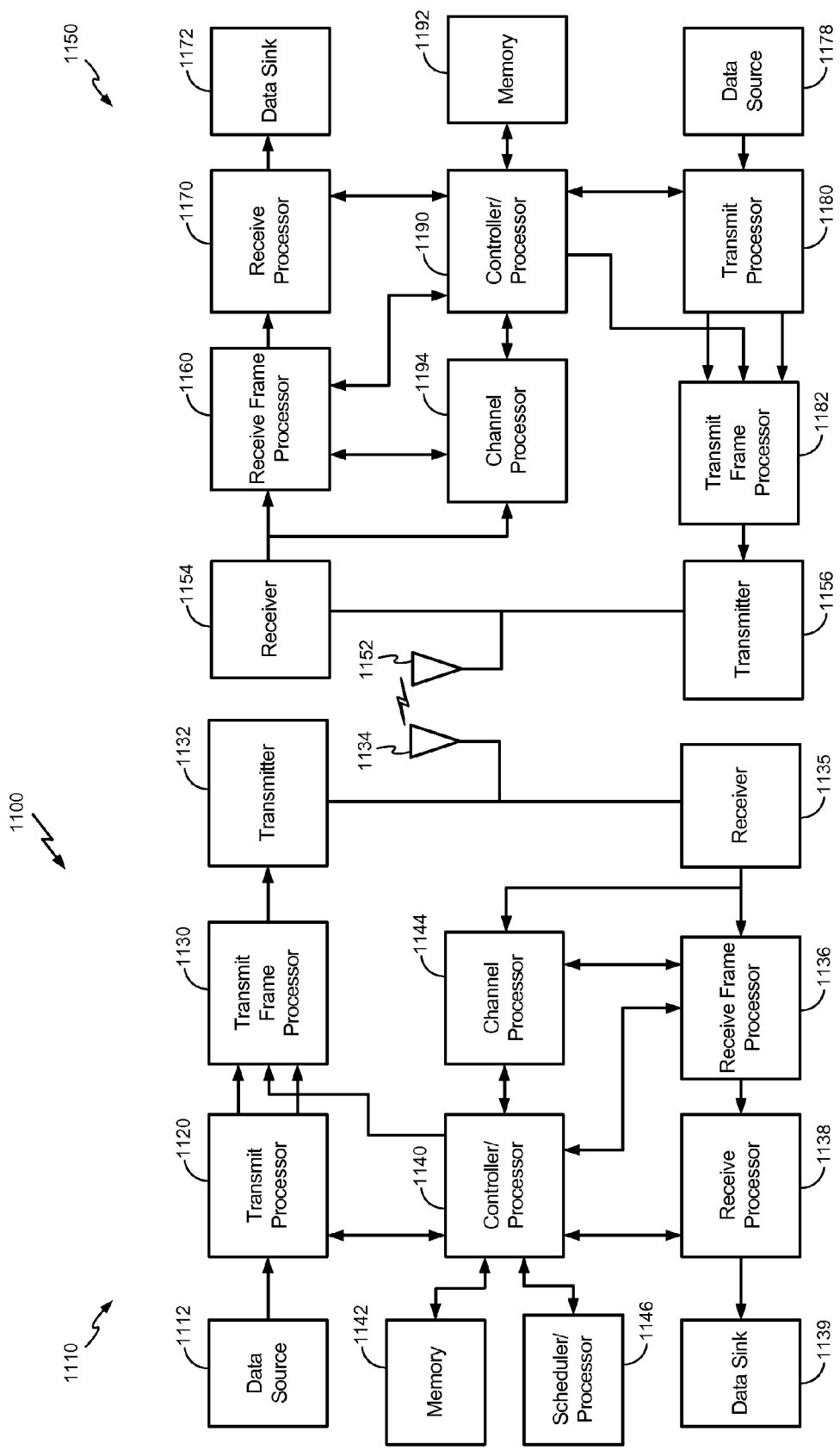
FIG. 11 is a block diagram illustrating an example of a base station (e.g., eNB) in communication with a UE in a telecommunications system having aspects configured to set up a video telephony call.

Referring to FIG. 11, a Node B 1110 is in communication with a UE 1150 and having aspects configured to set up a PSVT call. In an aspect, the Node B 1110 may be an example component of network 104 or network 106 of FIG. 1. In an aspect, the UE 850 may be an example of MO device 102 having PSVT call component 110 or MT device 108 having PSVT call component 112 of FIG. 1. In the downlink communication, a transmit processor 1120 may receive data from a data source 1112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The information recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the Node B 1110. More specifically, the receive processor 1170 descrambles and despreads the symbols, and then determines the most likely signal constellation points transmitted by the Node B 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190. When frames are unsuccessfully decoded by the receiver processor 1170, the controller/processor 1190 may also use an acknowledgement (ACK) and/or negative acknowledgement (NACK) protocol to support retransmission requests for those frames.

In the uplink, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the Node B 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the Node B 1110 or from feedback contained in the midamble transmitted by the Node B 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the Node B 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the Node B 1110 and the UE 1150, respectively. For example, the controller/processors 1140 and 1190 may provide various functions including timing, peripheral interfaces, voltage regulation, power management, and other control functions. The computer readable media of memories 1142 and 1192 may store data and software for the Node B 1110 and the UE 1150, respectively. A scheduler/processor 1146 at the Node B 1110 may be used to allocate resources to the UEs and schedule downlink and/or uplink transmissions for the UEs.

In some aspects, transmitter 1156 and receiver 1154 may be included in transceiver(s) 46 or 47 in FIGS. 2A and 2B. Processor(s) 20 and 21 in FIGS. 2A and 2B may include one or more of the processors listed for the UE (e.g., 1160, 1170, 1194, 1190, 1182, or 1180). Memory 44 and 45 in FIGS. 2A and 2B may include one or more of memory 1192, data sink 1172, or data source 1178.

Figure 12:
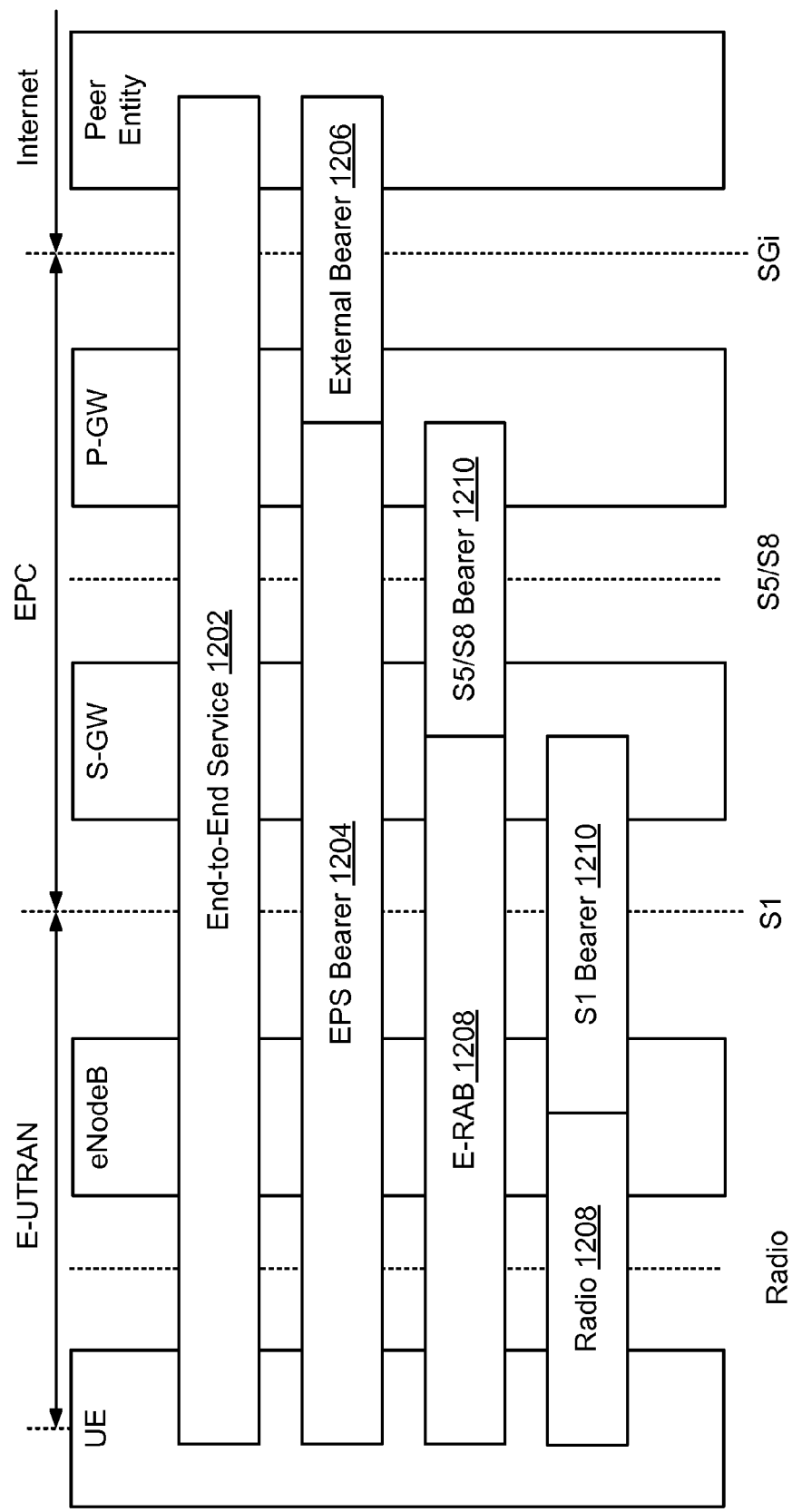
FIG. 12 is a diagram illustrating EPS bearers that may be utilized to establish a PSVT call between MO device 102 and MT device 108 over LTE.

Referring to FIG. 12, bearers in LTE that may be utilized to establish a PSVT call between MO device 102 and MT device 108 are illustrated. The UE and the peer entity as shown in FIG. 12 may respectively refer to MO device 102 and MT device 108. End-to-end service 1202 may refer to communication services between MO device 102 and MT device 108. EPS bearer 1204 may refer to a bearer between MO device and network 106. EPS bearer 1204 may further include an external bearer 1206 between network 106 and MT device 108. EPS bearer 1204 may refer to a combination of an E-UTRAN Radio Access Bearer (E-RAB) 1208, an S5/S8 bearer 1210 between network 104 and network 106, a radio bearer 1210 between MO device 102, and an S1 bearer 1210 between an eNB and network 104.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Several aspects of a telecommunications system have been presented with reference to a W-CDMA system. As those skilled in the art will readily appreciate, various aspects described throughout this disclosure may be extended to other telecommunication systems, network architectures and communication standards. By way of example, the techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for a packet-switched video telephony (PSVT) call, comprising:
    transmitting, from a mobile originated (MO) device, an invitation for a PSVT call to a mobile terminated (MT) device, Wherein the invitation initiates a process to reserve and identify video resources and audio resources to establish the PSVT call;
    determining whether the video resources are available for the PSVT call; and
    establishing the PSVT call having only an audio stream between the MO device and the MT device when the audio resources are available for the PSVT call and a determination is made that the video resources are not available for the PSVT call.

2. The method of claim 1, wherein determining that the video resources are not available comprises determining that a video quality-of-service (QoS) is not activated for the MO device or the MT device.

3. The method of claim 1, wherein the transmitting comprises transmitting the invitation from the MO device to the MT device via a first network entity associated with the MO and a second network entity associated with the MT.

4. The method of claim 3, further comprising indicating, by the first network entity or the second network entity, in the invitation of the PSVT call or in a response to the invitation, that the video resources are not available for the PSVT call, wherein either the first network entity or the second network entity is a back-to-back user agent (B2BUA) and has determined that the video resources are not available for the PSVT call.

5. The method of claim 1, wherein the determining comprises:
  starting a first timer at the MO device when the MO device receives an acknowledgement of the invitation from the MT device;
  determining that a second timer at the MT device has been initiated when the MT device transmits the acknowledgement of the invitation to the MO device; and
  determining that the video resources are not available if the video resources cannot be reserved to establish the PSVT call before either the first timer or the second timer expires.

6. The method of claim 1, further comprising:
  automatically initiating video components of the MO device for a video stream of the PSVT when a determination is made that the video resources are available; and
  adding the video stream to the PSVT call between the MO device and the MT device if the video components are initiated before receiving a response from a user of the MT devices to the invitation for the PSVT call.

7. The method of claim 1, further comprising:
  in response to a determination is made that the video resources are available,
  automatically initiating video components of the MO device for a video stream of the PSVT call;
  establishing the PSVT call having only the audio stream between the MO device and the MT device if the video components are initiated subsequent to a user of the MT devices responding to the invitation for the PSVT call; and
  adding the video stream to the established PSVT call between the MO device and the MT device.

8. The method of claim 1, further comprising setting, within QoS attributes in the invitation, a strength-tag for the audio resources as mandatory and setting a strength-tag for the video resources as optional.

9. The method of claim 1, further comprising:
  establishing one or more first bearers between the MO device and the MT device for a voice over IP (VoIP) call that utilizes the audio resources; and
  establishing one or more second bearers between the MO device and the MT device for the PSVT call that utilizes the video resources.

10. The method of claim 1, further comprising downgrading the PSVT call to a voice over IP (VoIP) call.

11. The method of claim 10, wherein the VoIP call is a voice over Long Term Evolution (VoLTE) call.

12. An apparatus for a packet-switched video telephony (PSVT) call, comprising:
  a transceiver configured to transmit information;
  a memory configured to store the information; and
  a processor in communication with the memory, the processor and the memory configured to:
    transmit, via the transceiver and from a mobile originated (MO) device, an invitation for a PSVT call to a mobile terminated (MT) device, wherein the invitation initiates a process to reserve and identify video resources and audio resources to establish the PSVT call;
    determine whether the video resources are available for the PSVT call; and
    establish the PSVT call having only an audio stream between the MO device and the MT device when the audio resources are available for the PSVT call and a determination is made that the video resources are not available for the PSVT call.

13. The apparatus of claim 12, wherein the processor and the memory are further configured to determine that a video quality-of-service (QoS) is not activated for the MO device or the MT device.

14. The apparatus of claim 12, wherein the processor and the memory are further configured to transmit the invitation, via the transceiver, from the MO device to the MT device via a first network entity associated with the MO and a second network entity associated with the MT.

15. The apparatus of claim 14, wherein the first network entity and the second network entity are configured to indicate, in the invitation of the PSVT call or in a response to the invitation, that the video resources are not available for the PSVT call, wherein either the first network entity or the second network entity is a back-to-back user agent (B2BUA) and has determined that the video resources are not available for the PSVT call.

16. The apparatus of claim 12, wherein the processor and the memory are configured to:
  start a first timer at the MO device when the MO device receives an acknowledgement of the invitation from the MT device;
  determine that a second timer at the MT device has been initiated when the MT device transmits the acknowledgement of the invitation to the MO device; and
  determine that the video resources are not available if the video resources cannot be reserved to establish the PSVT call before either the first timer or the second timer expires.

17. The apparatus of claim 12, wherein the processor and the memory are configured to:
  automatically initiate video components of the MO device for a video stream of the PSVT when a determination is made that the video resources are available; and
  add the video stream to the PSVT call between the MO device and the MT device if the video components are initiated before receiving a response from a user of the MT devices to the invitation for the PSVT call.

18. The apparatus of claim 12, wherein the processor and the memory are configured to:
  in response to a determination is made that the video resources are available,
  automatically initiate video components of the MO device for a video stream of the PSVT call;
  establish the PSVT call having only the audio stream between the MO device and the MT device if the video components are initiated subsequent to a user of the MT devices responding to the invitation for the PSVT call; and
  add the video stream to the established PSVT call between the MO device and the MT device.

19. The apparatus of claim 12, wherein the processor and the memory are configured to set, within QoS attributes in the invitation, a strength-tag for the audio resources as mandatory and setting a strength-tag for the video resources as optional.

20. The apparatus of claim 12, wherein the processor and the memory are configured to:

establish one or more first bearers between the MO device and the MT device for a voice over IP (VoIP) call that utilizes the audio resources; and establish one or more second bearers between the MO device and the MT device for the PSVT call that utilizes the video resources.

21. The apparatus of claim 12, wherein the processor and the memory are configured to downgrade the PSVT call to a voice over IP (VoIP) call.

22. The apparatus of claim 21, wherein the VoIP call is a voice over Long Term Evolution (VoLTE) call.

23. An apparatus for a packet-switched video telephony (PSVT) call, comprising:

means for transmitting, from a mobile originated (MO) device, an invitation for a PSVT call to a mobile terminated (MT) device, wherein the invitation initiates a process to reserve and identify video resources and audio resources to establish the PSVT call;

means for determining whether the video resources are available for the PSVT call; and means for establishing the PSVT call having only an audio stream between the MO device and the MT device when the audio resources are available for the PSVT call and a determination is made that the video resources are not available for the PSVT call.

24. The apparatus of claim 23, wherein the means for determining comprises means for determining that a video quality-of-service (QoS) is not activated for the MO device or the MT device.

25. The apparatus of claim 24, wherein the means for transmitting comprises means for transmitting the invitation from the MO device to the MT device via a first network entity associated with the MO and a second network entity associated with the MT.

26. The apparatus of claim 25, further comprising means for indicating, by the first network entity or the second network entity, in the invitation of the PSVT call or in a response to the invitation, that the video resources are not available for the PSVT call, wherein either the first network entity or the second network entity is a back-to-back user agent (B2BUA) and has determined that the video resources are not available for the PSVT call.

27. The apparatus of claim 23, wherein the means for determining comprises:

means for starting a first timer at the MO device when the MO device receives an acknowledgement of the invitation from the MT device;

means for determining that a second timer at the MT device has been initiated when the MT device transmits the acknowledgement of the invitation to the MO device; and means for determining that the video resources are not available if the video resources cannot be reserved to establish the PSVT call before either the first timer or the second timer expires.

28. The apparatus of claim 23, further comprising:

means for automatically initiating video components of the MO device for a video stream of the PSVT when a determination is made that the video resources are available; and means for adding the video stream to the PSVT call between the MO device and the MT device if the video components are initiated before receiving a response from a user of the MT devices to the invitation for the PSVT call.

29. The apparatus of claim 23, further comprising:

in response to a determination is made that the video resources are available, means for automatically initiating video components of the MO device for a video stream of the PSVT call;

means for establishing the PSVT call having only the audio stream between the MO device and the MT device if the video components are initiated subsequent to a user of the MT devices responding to the invitation for the PSVT call; and means for adding the video stream to the established PSVT call between the MO device and the MT device.

30. A non-transitory computer-readable medium storing computer executable code for a packet-switched video telephony (PSVT) call, comprising:

code for transmitting, from a mobile originated (MO) device, an invitation for a PSVT call to a mobile terminated (MT) device, wherein the invitation initiates a process to reserve and identify video resources and audio resources to establish the PSVT call;

code for determining whether the video resources are available for the PSVT call; and code for establishing the PSVT call having only an audio stream between the MO device and the MT device when the audio resources are available for the PSVT call and a determination is made that the video resources are not available for the PSVT call.

* * * * *